ns Patent [19]

United States Patent [19]
Hellberg

[11] 3,961,079
[45] June 1, 1976

[54] ENSILING OF GREEN FODDER WITH HEXAMETHYLENE TETRAMINE AND SODIUM NITRITE

[75] Inventor: Arvid Emanuel Hellberg, Uppsala, Sweden

[73] Assignee: Plate Kofasil Gesellschaft mit beschrnäkter Haftung, Bonn, Germany

[22] Filed: Feb. 28, 1974

[21] Appl. No.: 446,762

Related U.S. Application Data

[63] Continuation of Ser. No. 309,151, Nov. 24, 1972, which is a continuation of Ser. No. 99,265, Dec. 17, 1970, which is a continuation of Ser. No. 667,358, Sept. 13, 1967, abandoned.

[52] U.S. Cl.................................. 426/54; 426/321; 252/401
[51] Int. Cl.$^2$........................................... A23K 3/03
[58] Field of Search........................ 99/8, 8 E, 9, 2; 260/248.5; 23/104, 302; 71/54, 61, 92; 252/401, 399; 426/18, 49, 54, 74, 321, 532

[56] References Cited
UNITED STATES PATENTS

| | | | |
|---|---|---|---|
| 2,160,167 | 5/1939 | Pfeiffer | 99/8 |
| 2,263,746 | 11/1941 | Stauf et al. | 99/8 |
| 3,244,710 | 4/1966 | Larsen | 252/401 |

FOREIGN PATENTS OR APPLICATIONS

| | | | |
|---|---|---|---|
| 1,010,749 | 3/1952 | France | 99/8 E |
| 298,412 | 7/1916 | Germany | 260/248.5 |

OTHER PUBLICATIONS

Chemical Abstracts, vol. 7, Part 2, May–Aug., 1913, p. 1457, "Some Unstable Nitrites Fixed by Means of Organic Bases", G. Scagliarini.

*Primary Examiner*—Norman Yudkoff
*Assistant Examiner*—Curtis P. Ribando
*Attorney, Agent, or Firm*—Toren, McGeady and Stanger

[57] ABSTRACT

When ensiling fodder, such as grass, clover, lucerne, it has been found useful to add hexamethylenetetramine and a nitrite to the fodder.

5 Claims, No Drawings

ENSILING OF GREEN FODDER WITH HEXAMETHYLENE TETRAMINE AND SODIUM NITRITE

This is a continuation of Ser. No. 309,151 filed Nov. 24, 1972 which in turn was a continuation of application Ser. No. 99,265 filed Dec. 17, 1970 which in turn was a continuation of application Ser. No. 667,358 filed Sept. 13, 1967 and now abandoned.

The invention is concerned with a composition for the ensiling of fodder. The invention is primarily concerned with the ensiling of green fodder, such as grass, clover and lucerne, but is also useful for the ensiling of fodder based upon other plant materials, such as potatoes and beet pulp, and also for the ensiling of fodder based upon animal material, such as offals from the fish and meat industries.

It is known that the preservation of green fodder in a silo can be improved by the addition of chemical compounds affecting the fermentation of the green fodder. It is desired that said chemical compounds shall have a selective bacteriostatic action, so as to promote fermentation processes producing lactic acid but suppressing the growth of butyric acid bacteria.

Various chemical compounds, and combinations of two or more compounds, have been used for ensiling purposes. It has been an inconvenience that said known ensiling compositions have not been entirely reliable. Although useful for the ensiling of green fodder of one crop, they may have failed in ensiling similar green fodder of another crop. It is the main object of the invention to provide an ensiling composition resulting in a low production of undesired products such as butyric acid, acetic acid and ammonia, and in a low loss of organic material such as sugar and protein.

It has been found, according to the present invention, that a useful and reliable ensiling composition contains, as active ingredients, hexamethylenetetramine (also called hexamine) and a nitrite, preferably sodium nitrite. The active ingredients may be dissolved in water, and the solution may be sprayed onto the green fodder. I prefer, however, to use a dry, pulverulent mixture of the active ingredients. If desired, the dry mixture may contain an inactive, pulverulent filler material. The ratio by weight of hexamethylenetetramine to sodium nitrite should be 9:1 to 1:30 I usually prefer to use a mixture containing approximately 55 – 65 % by weight of hexamethylenetetramine and 35 – 45 % by weight of sodium nitrite.

The composition of the invention should preferably be added to the fodder in a quantity of 0.1 – 0.5 % by weight if used for the ensiling of green fodder or other plant materials. I usually prefer to add 0.2 – 0.4 % by weight. When used for the ensiling of animal materials a quantity of 0.5 – 1.0 % by weight is preferred. The composition of the invention is added to the fodder in any known way. When ensiling green fodder I prefer to supply a layer of green fodder into a silo, to strew a quantity of pulverulent ensiling composition on said layer of green fodder, to supply another layer of green fodder upon the first layer, and so on. It has been found that the ensilage should preferably be kept in the silo for at least three weeks before it is consumed.

EXAMPLE

The experiment was carried out with blue lucerne with 17.3 % dry matter, stored at 27°C in 40 days. The choice of herbage and storage temperature was made with intention of applying fairly rigorous testing conditions. Various ratios of hexamethylenetetramine to sodium nitrite were tested and compared with ensiling without additive and also with the use of sodium nitrite alone. The ensiling composition was added as a dry pulverulent mixture. Details of the experimental plan and the results are given below.

| Ensiling composition % by weight of lucerne | Sodium nitrite % by weight of ensiling composition | Lactic acid | Acetic acid | Butyric acid | Loss of organic substance % by weight |
|---|---|---|---|---|---|
| No additive | No additive | 0.30 | 1.54 | 1.10 | 30.21 |
| 0.4 | 12.5 | 0.90 | 0.64 | 0.24 | 12.12 |
| 0.28 | 25.0 | 1.10 | 0.57 | 0.17 | 11.50 |
| 0.40 | 25.0 | 1.10 | 0.41 | 0.02 | 7.09 |
| 0.52 | 25.0 | 1.10 | 0.48 | 0.05 | 10.22 |
| 0.28 | 37.5 | 1.00 | 0.58 | 0.20 | 11.72 |
| 0.40 | 37.5 | 1.03 | 0.41 | 0.02 | 8.14 |
| 0.52 | 37.5 | 1.10 | 0.46 | 0.05 | 10.02 |
| 0.28 | 50.0 | 0.60 | 0.72 | 0.49 | 13.40 |
| 0.40 | 50.0 | 1.10 | 0.42 | 0.01 | 8.35 |
| 0.52 | 50.0 | 1.13 | 0.49 | 0.02 | 8.77 |
| 0.40 | 62.5 | 1.00 | 0.59 | 0.17 | 10.65 |
| 0.25 | 100.0 | 0.30 | 1.38 | 0.94 | 23.42 |

The table shows that there was a small effect from nitrite alone, as compared to the experiment in which no ensiling composition was added. The table also shows that all mixtures of hexamethylenetetramine and sodium nitrite were superior to nitrite alone. Though not listed above, experiments were also made with hexamethylenetetramine alone, but this compound was not found to be effective.

What is claimed is:

1. A method of ensiling green fodder, which comprises adding to the green fodder about 0.1 to 1.0% by weight of a dry pulverulent mixture of hexamethylene tetramine and sodium nitrite in a ratio of from 9:1 to 1:3, and allowing the fodder to ferment.

2. A method of ensiling fodder based upon plant material, which comprises adding to the fodder about 0.1 to 0.5% by weight of a dry pulverulent mixture of hexamethylene tetramine and sodium nitrite in a ratio of from 9:1 to 1:3 and allowing the fodder to ferment.

3. A dry fodder ensiling agent consisting essentially of a physical mixture of hexamethylene tetramine and sodium nitrite in a ratio of from 9:1 to 1:3.

4. A composition for the ensiling of fodder comprising a dry physical mixture of hexamethylene tetramine and sodium nitrite in a ratio of from 9:11 to 1:3 and an inert dry filler.

5. A composition as claimed in claim 4, wherein said mixture contains about 55–65 percent by weight of hexamethylene tetramine and about 35–45 percent by weight of sodium nitrite.

* * * * *